(No Model.)
F. M. PICKERING.
BLOCK FOR PAVING, &c.
No. 379,027. Patented Mar. 6, 1888.
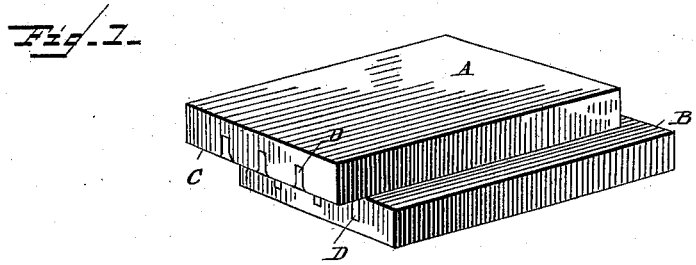
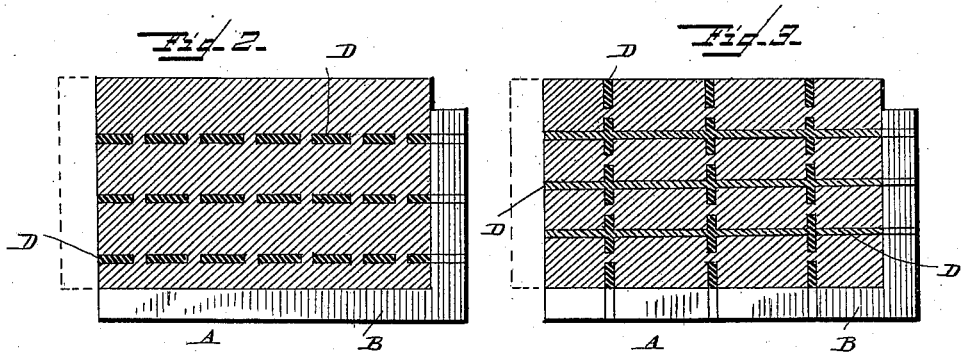
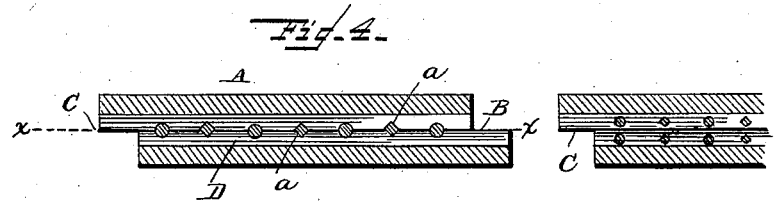
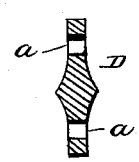
WITNESSES.
Edwin L. Yewell.
Alex Mahon.
INVENTOR,
Frank M. Pickering.
BY
Attorney.

UNITED STATES PATENT OFFICE.

FRANK M. PICKERING, OF CINCINNATI, OHIO.

BLOCK FOR PAVING, &c.

SPECIFICATION forming part of Letters Patent No. 379,027, dated March 6, 1888.

Application filed January 5, 1888. Serial No. 259,844. (No model.)

*To all whom it may concern:*

Be it known that I, FRANK M. PICKERING, a citizen of the United States of America, residing at Cincinnati, in the county of Hamilton and State of Ohio, have invented certain new and useful Improvements in Blocks for Paving and other Purposes, of which the following is a specification, reference being had therein to the accompanying drawings.

My invention relates to improvements in artificial-stone blocks for paving and other purposes.

The object of my invention is to produce an artificial-stone block for sidewalks and other purposes which will be strong and durable and at the same time readily raised and removed from its bed when occasion requires it.

My invention consists of an artificial-stone block having projecting lips or ledges to support the adjacent block, said lips and block being strengthened by suitable bars or rods embedded in the block.

In the drawings, Figure 1 is a perspective view of my improved block. Fig. 2 is a sectional view on the line $x\ x$ of Fig. 4. Fig. 3 is also a sectional view showing the strengthening-bars in both directions. Fig. 4 is a sectional end view. Fig. 5 is an end view of the strengthening-bar.

In the construction of sidewalks and footways from hydraulic cement, broken stone, &c., as heretofore practiced, they have generally been laid in bulk—*i. e.*, the broken stone and cement forming the foundation have been spread on the prepared bed to the depth required and the top or wearing surface of hydraulic cement spread thereon to the required depth, the upper surface being cut or marked off into blocks, so as to form lines of fracture in cases where the frost causes upheavals. This method of laying sidewalks, &c., is objectionable in many respects, some of which may be stated as follows: First, that the sidewalk is blocked up for a considerable time in order to allow the cement to set and harden in position, which is a great annoyance to pedestrians and a detriment to business; second, that fair weather is necessary in order to lay the pavement properly, and, third, that when laid it cannot be removed for the purpose of laying water and gas pipes without destroying that portion of the pavement. On the other hand, I manufacture my blocks in the factory, from whence they can be taken and laid in position at any time or place and at any season of the year without blocking off the entrance to houses or stores, and are ready for use when laid, and, furthermore, can readily be raised or removed for subterranean improvements or repairs without injury to the blocks or damage to any other portion of the sidewalk or pavement.

Referring to the drawings, A indicates my improved block, which may be of any size or shape—such as square, rectangular, round, octagonal, or other desired form—and made of hydraulic cement or other suitable material. One or more sides of the block is provided with a lip or flange, B, the other sides of the block being provided with a projecting lip or flange, C, which rests upon the lip or flange B of the adjacent blocks when placed in position in the sidewalk.

D are strengthening-bars, which may be made of iron, wood, or other suitable material, and are by preference placed transverse to the length of the block, as shown in Fig. 1, said bars being of the form shown in Fig. 5, and provided with apertures $a$, through which the cement will pass to lock or bind the bar in position. These bars D are embedded in the center of the block, and are cut away at their ends to form lips or flanges to correspond with the lips or flanges B and C of the block, the thicker portion of the bar forming an extended bearing-surface to rest upon said lips or flanges B and C. The object of these bars is to give strength and rigidity to the thinner edges of the block, and thus prevent them from breaking off when the pavement is subjected to heavy loads, and also to prevent one block from sinking below the level of the adjacent block, thus insuring a level surface at all times.

In Fig. 3 I have shown a block in which the strengthening-bars are placed in both a longitudinal and transverse direction, and in this instance as well the projecting lips of the bars extend to the edge of the block to strengthen this portion.

In the manufacture of these blocks the molds are partially filled with hydraulic concrete or other material from which the blocks are made and the strengthening-bars placed thereon.

The mold is then filled to form a block of the desired thickness, and thoroughly tamped, so as to embed the bars therein. Where the longitudinal and transverse bars are both used, they may be constructed in the form of a rigid frame-work. When the blocks are laid in position, the lips or ledges are coated with a water-proof cement, which effectually seals the joint and prevents the water from entering. This is an important feature where the blocks are used for covering area-ways and are supported by an outer and inner wall only, or by girders.

Having now described my invention, what I claim, and desire to secure by Letters Patent, is—

1. A block of artificial stone for paving and other purposes, having lips or ledges on the edges thereof, and strengthening-bars extending through and forming a portion of said lips or ledges, as set forth.

2. A pavement or sidewalk composed of blocks of artificial stone or other material, said blocks being provided with supporting-lips, offsets, or ledges in their edges, said ledges being strengthened by metallic or other suitable bars.

3. In an artificial-stone block for paving and other purposes, a strengthening-bar embedded in said block having an enlarged central portion, said bar being cut away at its ends through such enlarged portion to form an enlarged bearing-surface on the lips or ledges of the block, as set forth.

In testimony whereof I affix my signature in presence of two witnesses.

F. M. PICKERING.

Witnesses:
ALEX. MAHON,
L. M. SINSABAUGH.